Patented Jan. 26, 1954

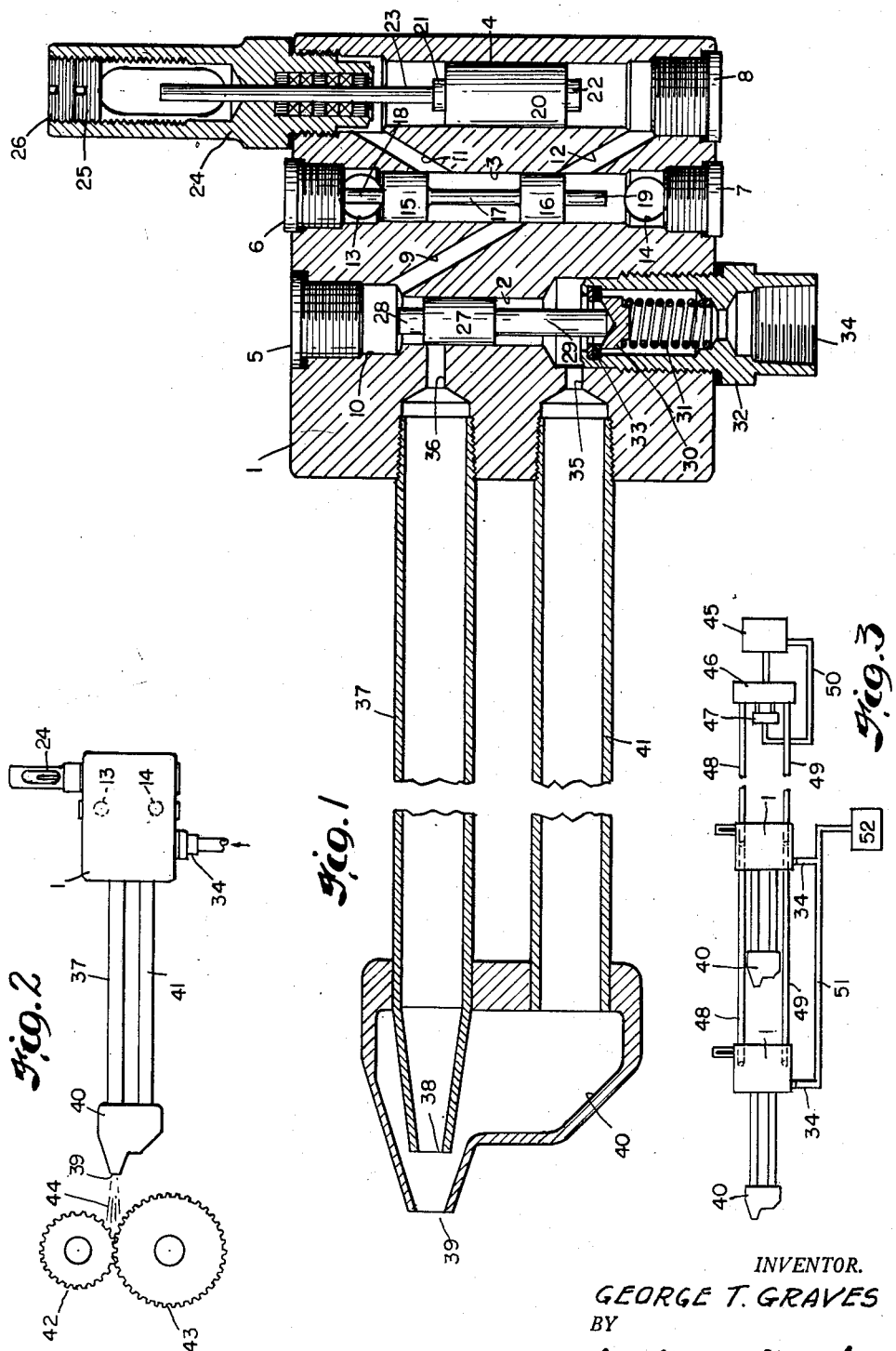

2,667,236

UNITED STATES PATENT OFFICE 2,667,236

LUBRICANT MEASURING SPRAY MEANS

George T. Graves, Bedford, Ohio, assignor to The Farval Corporation, Cleveland, Ohio, a corporation of Ohio Application April 21, 1950, Serial No. 157,209

3 Claims. (Cl. 184—7)

This invention relates as indicated to a novel spray device and, more particularly, to mechanism adapted to spray a lubricant upon surfaces to be lubricated.

In United States Patent No. 2,016,372 to Aaron J. Jennings a special measuring valve is disclosed adapted to dispense desired amounts of lubricant to a bearing, for example, at predetermined intervals. Application Serial No. 687,474 of George H. Acker, filed July 31, 1946, now Patent Number 2,610,178, for "Lubricating Mechanism," describes and illustrates pumping, metering and lubricant delivery means of the "Dualine" type whereby a measured quantity of lubricant or like fluid may be delivered alternately to two different supply lines leading to a measuring valve at the bearing where the desired quantity of lubricant will thereupon be dispensed. Such lubricating systems have been found highly advantageous in providing for the automatic lubrication at timed intervals of the large and complex machinery employed in modern manufacturing operations. The operation of such systems is positive in all respects, the desired quantity of lubricant being dispensed at the desired intervals without the possibility of overlooking any bearing. There are, however, various mechanisms such as gear trains, long actuating screws, etc., which require periodic lubrication, but where such lubricant should be spread over a relatively large unconfined area, as a coating. It is often necessary to lubricate such parts manually, by means of a brush, or a swab. Under such circumstances it is always possible that the amount of lubricant applied may be insufficient or excessive, and the applications may not be sufficiently frequent. In order to avoid the necessity of thus applying lubricant to such parts at frequent intervals, it is common practice to apply a heavier grease than would otherwise be considered desirable.

It is accordingly a primary object of my invention to provide means for automatically applying a lubricant, which may be oil, grease, or gear compound, to a relatively large area to be lubricated, at timed intervals.

Another object is to provide fluid dispensing means operative to spray such fluid upon the surface to be treated.

A further object is to provide means for spraying a lubricant such as a light grease upon a working surface, wherein the discharge of the fluid to be sprayed is effective automatically to release the proper quantity of compressed air for the proper period of time to produce such spray.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a vertical section taken through my new measuring valve and spray device to show the internal arrangement of the parts thereof;

Fig. 2 is a semi-diagrammatic elevational view of such device illustrating the manner in which lubricant may be sprayed upon a gear train or the like; and Fig. 3 is a diagram illustrating generally the manner in which my new spray device may be incorporated in the well-known "Dualine" system.

Referring now more particularly to said drawing and especially Fig. 1 thereof, the metal valve body or block 1 is made with three parallel bores, or cylinders 2, 3 and 4. The upper ends of cylinders 2 and 3 are closed by means of plugs 5 and 6 and the lower ends of cylinders 3 and 4 by means of plugs 7 and 8. An inclined passage 9 leads from the mid-point of cylinder 3 to chamber 10 at the upper end of cylinder 2. Passages 11 and 12 lead from the upper and lower ends respectively of cylinder 4 to cylinder 3, opening into the latter at points midway between the opening of passage 9 into cylinder 3 and the alternate supply ports 13 and 14 which communicate with the upper and lower ends respectively of cylinder 3.

A pilot valve member is reciprocable within cylinder 3 and comprises two pistons 15 and 16 rigidly connected by means of rod 17 and provided with spacer members 18 and 19 on their respective ends extending a distance equal to the diameters of inlet ports 13 and 14. Such pistons 15 and 16 are spaced a distance apart such that when the valve member is shifted from one end to the other of cylinder 3 passages 11 and 12 will alternately be placed in communication with passage 9. When passage 11 is thus in communication with passage 9 (see Fig. 1), but blocked from inlet port 13, then passage 12 will be in communication with inlet port 14 but blocked from passage 9.

A measuring piston 20 fits closely within cylinder 4 for reciprocation therein, being provided with spacer members 21 and 22 effective to ensure that the openings to passages 11 and 12 are not entirely closed. An indicator stem 23 attached to piston 20 extends upwardly through packing gland 24, upward movement of such stem and therefore of piston 20 being limited by engagement of the upper end of the stem with adjusting screw 25 which may be locked in selected position by means of upper screw 26.

A piston 27 is fitted within cylinder 2 for reciprocation therein and is provided with an upper extension 28 effective to limit upward reciprocation of such piston and a lower extension 29 engaging a loosely fitting air valve piston 30. A spring 31 seated in air valve body 32 bears against such piston 30 tending to hold the same in sealing engagement with valve seat 33. Such valve body is, of course, in communication with air inlet port 34 adapted to be connected to an appropriate compressed air conduit. Spring 31 is thus ordinarily effective both to hold valve member 30 against its seat 33, preventing escape of air through air outlet port 35, and also holding piston 27 in position to seal off lubricant exit port 36 as shown in Fig. 1.

Lubricant exit orifice 36 communicates with conduit 37 provided with a somewhat restricted orifice 38 aligned with spray nozzle exit orifice 39. Such spray nozzle comprises a chamber 40 into which air conduit 41 leads from air outlet 35.

Now referring to Fig. 2 of the drawing, the spray nozzle exit orifice 39 is there shown directed toward two meshing gears 42 and 43 to dispense a lubricant spray 44 upon the teeth thereof. It will be understood, of course, that the valve body 1 may be at some distance from the spray nozzle and mechanism to be lubricated, the conduits 37 and 41 being bent or otherwise arranged properly to position such nozzle.

As above indicated, a preferred mechanism and system for supplying lubricant to my new dispensing device is shown and described in such Acker application Serial No. 687,474. I have accordingly in Fig. 3 only diagrammatically illustrated such system as connected to my new dispensing means. Such supply system may comprise a pump 45 adapted continuously to deliver lubricant to flow shifter valve 46 which in turn delivers such lubricant to a serving cylinder 47 adapted to deliver a measured quantity of lubricant alternately to lubricant supply line 48 and lubricant supply line 49. Upon delivery of such measured quantity, the continuing discharge of the pump is diverted to line 50, returning the same to reservoir until timing means next shifts flow shifter valve 46 to cause a measured quantity of lubricant now to be directed to the other supply line. On such occasions, the supply line not receiving lubricant will be connected to reservoir.

As shown in Fig. 3, a plurality of my devices may be connected in parallel to a lubricant source of the type indicated, lubricant supply line 48 communicating with inlet ports 13 and lubricant supply line 49 communicating with inlet ports 14. The air inlet ports 34 of the respective air valves are in communication with an air supply conduit 51 communicating with a source of compressed air 52.

The operation of the above-described mechanism may now be understood: Considering both Figs. 1 and 3, lubricant under pressure is admitted to line 49 and enters pilot valve cylinder 3 through inlet port 14. Pilot valve members 15, 16, 17 and measuring piston 20 will each be in their lowermost positions. The lubricant entering port 14 will first shift such pilot valve member upwardly to the position shown in Fig. 1, permitting such lubricant to pass through passage 12 into the lower end of cylinder 4 where it will force piston 20 upwardly, displacing the lubricant contained in cylinder 4 above such piston through passage 11. Such measured quantity of lubricant then continues through cylinder 3 and passage 9 into chamber 10 where it acts to depress piston 27 against the action of spring 31. When such piston has been sufficiently depressed, it uncovers port 36 permitting discharge of lubricant through port 36 into conduit 37, and it also unseats air valve piston 30, and allows air under pressure to enter spray nozzle 40 through port 35 and conduit 41. The size of the orifice 38 is determined by the nature of the lubricant being employed; whether it be viscous or more highly fluid, so that conduit 37 is normally filled with lubricant. The admission of more lubricant into conduit 37 from the metering valve therefore displaces an equivalent amount of lubricant from orifice 38, where it is picked up by the high velocity jet of expanding air and sprayed through the orifice 39 on to the surface toward which orifice 39 is directed. The effect of spring 32 and also of the air pressure is to tend to seat valve member 30 and thereby move piston 27 upwardly to close lubricant exit port 36. The combined forces of the spring 31 and of the air under pressure acting against piston 30 will be appreciably less than the effective pressure of the lubricant acting on piston 27 when lubricant is being discharged into chamber 28, so that all of the lubricant displaced by the piston 20 must be discharged through passage 36 before the spring 31, assisted by the air pressure, can force piston 27 upward to close port 36 and reseat air valve piston 30.

It will be seen from the foregoing that the pressure of the discharged lubricant itself serves to actuate the valve controlling the compressed air supply to the spray nozzle. Accordingly, such compressed air is admitted immediately when required but is likewise shut off the moment lubricant ceases to be discharged at orifice 38. Not only is such operation automatic and foolproof, but also it is effective in conserving the compressed air supply since such air will be delivered at the nozzle only for the exact period required. When a number of my spray devices are connected together in the general manner illustrated in Fig. 3, they tend to be operated somewhat in sequence due to natural flow resistance in the lines, and this also incidentally serves to prevent all of such devices drawing upon the compressed air supply simultaneously. This is a matter of some importance in many installations inasmuch as most shops have quite a limited air supply available.

While I have shown and described my new spray device in combination with a preferred fluid delivery mechanism and system, it is to be understood that in its broader aspects my invention may be employed in conjunction with a variety of other devices or systems operative to deliver a desired fluid to chamber 10. Likewise, while the particular embodiment of my invention illustrated has been described for use in dispensing a lubricant spray, it will readily be understood that various other fluids may be delivered to the spray nozzle in the manner described, and gases under pressure may be utilized other than air, if desired. The precise form of spray nozzle employed may likewise be modified by substituting any other of the well-known types of nozzles depending upon the particular fluid mediums to be delivered thereto and the type of spray considered most suitable. The nozzle shown provides internal atomization but a type providing external atomization may be utilized if desired.

A single line lubricant supply system with a spring return measuring valve may be employed instead of the "Dualine" system to deliver a measured charge of lubricant to the spray nozzle or, for that matter, the lubricant may be delivered directly from the pump, but a more precisely controlled method will ordinarily be preferred. The indicator stem 23 not only serves to regulate the stroke of piston 20 but also, by its movement, shows that the charge of lubricant has been delivered to the corresponding spray nozzle. In the system described, the pump and serving cylinder 47 will be designed to deliver more than enough lubricant to the measuring valves which then dispense the exact desired amounts, such metered charges of lubricant, with the system pressure behind them, being effective to control the operation of the respective air supply valves. In an ordinary application, such lubricant system pressure may be on the order of about 500 lbs./sq. in. to 1000 lbs./sq. in., for example, with an air line pressure of about 75 lbs./sq. in. to about 120 lbs./sq. in. The spray dispensed may have a variety of desirable effects, such as flushing away dirt, scale and chips, as well as lubricating such surfaces as the sliding surfaces on forging presses, continuous welders, and the like.

It will be seen from the foregoing that I have provided fluid mixing means having separate conduits adapted to deliver different fluids thereto, and means adapted to control such fluid flow in one conduit in response to fluid pressure in another conduit. Numerous modifications of the embodiment of the invention illustrated and described will be readily apparent to those skilled in the art.

Other modes of applying the principle of the invention may be employed, change being made as regards the details described, provided the features stated in any of the following claims or the equivalent of such be employed.

I therefore particularly point out and distinctly claim as my invention:

1. In a lubricant dispensing system including two lubricant supply lines, a pump operative to deliver lubricant to such lines under pressure, means adapted intermittently to meter the discharge of such pump alternately to each of such lines, the line not receiving lubricant being connected to relief, and a plurality of lubricant metering valves each comprising a measuring valve and a pilot valve adapted to receive such lubricant under pressure from such lines alternately, connect such line under pressure to one end of such measuring valve, and connect the other end of such measuring valve to a discharge passage for discharge of a measured amount of lubricant under pressure therefrom; the combination of a lubricant spray device associated with each such metering valve adapted to be actuated only by and during such discharge of such measured amount of lubricant, said spray device comprising a cylinder having one end in communication with such lubricant discharge passage, a closely fitting lubricant valve piston reciprocable in said cylinder, a lubricant exit port in the side of said cylinder adapted to be covered by said lubricant valve piston in one position of the latter and uncovered thereby upon slight reciprocation of the same by inflow of lubricant under pressure from such passage, a compressed air supply line, an air inlet valve connecting said air supply line to the end of said last-named cylinder opposite to that communicating with such lubricant discharge passage, said air inlet valve being axially aligned with said cylinder and comprising a valve piston adapted to seat externally thereof, a compression spring urging said air valve piston to seated position to close the same, an axial extension of said lubricant valve piston adapted to engage said air valve piston when said latter piston is thus seated, said lubricant valve piston then being in lubricant exit port closing position, a spray nozzle including a mixing chamber having a spray exit orifice, a conduit leading from said lubricant exit port to said nozzle and terminating within such chamber in alignment with such spray exit orifice, an air exit port in said cylinder between said air valve piston and said lubricant valve piston, and a conduit leading from said air exit port to such chamber, whereby, upon delivery of a predetermined amount of lubricant under pressure to said spray device cylinder said lubricant valve piston will be reciprocated thereby against the force of said compression spring and air pressure to uncover said lubricant exit port and open said air inlet valve, and lubricant will thereupon be expelled from such spray exit orifice under action of such air pressure, the air inlet valve being closed by said spring and air pressure when delivery of such predetermined amount of lubricant at said lubricant exit port has been completed and said lubricant valve piston therefore permitted to return to port closing position.

2. In a lubricant dispensing system including a plurality of lubricant measuring valves adapted intermittently to discharge measured amounts of lubricant under system pressure; the combination of a spray device with each such measuring valve adapted to be actuated by such discharge, said spray device comprising a cylinder adapted to receive such discharge under pressure in one end thereof, a closely fitting lubricant valve piston reciprocable in said cylinder, a lubricant exit port in the side of said cylinder adapted to be covered by said piston in one position of the latter and uncovered thereby upon slight reciprocation of the same by discharge of such lubricant under pressure to the end of said cylinder, whereupon such lubricant may flow out said port, a compressed air supply line, an air inlet valve connecting said air supply line to the end of said cylinder opposite to that adapted to receive such lubricant, said air inlet valve being axially aligned with said cylinder and comprising a valve piston adapted to seat externally thereof, resilient means urging said air valve piston to seated position to close the same, an extension of said lubricant valve piston adapted to engage said air valve piston, said air valve piston being seated to close said air valve when said lubricant valve piston is in lubricant exit port closing position and unseated when said lubricant valve piston is shifted to uncover said lubricant exit port, an air exit port in said cylinder intermediate said pistons and adapted to communicate with said air inlet valve, and a spray nozzle connected to said lubricant exit port and air exit port adapted to receive such lubricant and compressed air and to dispense the same in the form of a spray.

3. In a spray dispensing system including a pair of lubricant carrying lines adapted respectively alternately to be placed under pressure and connected to relief and measuring valves connected to such lines at spaced intervals therealong adapted to discharge measured amounts of lubricant upon alternation of such pressure in such lines; the combination of a spray device with each such measuring valve adapted to be actuated intermittently by such discharge, each said spray device comprising a normally closed lubricant valve adapted to receive such discharge and temporarily to open in response to the pressure of such discharge, a source of compressed air, a normally closed air valve connected with said source of compressed air, a spray nozzle adapted to receive lubricant and compressed air released by said respective valves and to dispense the same in the form of a spray and means interconnecting said two valves for substantially simultaneous opening and closing movement.

GEORGE T. GRAVES.

References Cited in the file of this patent

FOREIGN PATENTS

| Number | Country | Date |
| --- | --- | --- |
| 185,972 | Great Britain | Sept. 21, 1922 |
| 475,745 | Great Britain | Nov. 25, 1937 |